United States Patent [19]

Marshall et al.

[11] Patent Number: 4,908,749
[45] Date of Patent: Mar. 13, 1990

[54] SYSTEM FOR CONTROLLING ACCESS TO COMPUTER BUS HAVING ADDRESS PHASE AND DATA PHASE BY PROLONGING THE GENERATION OF REQUEST SIGNAL

[75] Inventors: Peter G. Marshall; Robert Feldstein, both of Grafton, Mass.

[73] Assignee: Data General Corporation, Westboro, Mass.

[21] Appl. No.: 798,595

[22] Filed: Nov. 15, 1985

[51] Int. Cl.⁴ ............... G06F 13/42; G06F 13/38; G06F 13/18

[52] U.S. Cl. ........................... 364/200; 364/229.2; 364/240.4; 364/242.92; 364/261.2; 340/825.50

[58] Field of Search ... 364/200 MS File, 900 MS File; 340/825.50, 825.51

[56] References Cited

U.S. PATENT DOCUMENTS

| | | | |
|---|---|---|---|
| 3,551,894 | 12/1970 | Lehman et al. | 364/900 |
| 3,603,935 | 9/1971 | Moore | 364/900 |
| 4,090,238 | 5/1978 | Russo | 364/200 |
| 4,281,380 | 7/1981 | DeMesa, III et al. | 340/825.5 |
| 4,371,925 | 2/1983 | Carberry et al. | 364/200 |
| 4,375,639 | 3/1983 | Johnson, Jr. | 340/825.5 |
| 4,390,944 | 6/1983 | Quackenbush et al. | 364/200 |
| 4,418,386 | 11/1983 | Vrielink | 364/200 |
| 4,442,502 | 4/1984 | Friend et al. | 364/900 |
| 4,541,043 | 9/1985 | Ballegeer et al. | 364/200 |
| 4,570,220 | 2/1986 | Tetrick et al. | 364/200 |
| 4,573,118 | 2/1986 | Damouny et al. | 364/200 |
| 4,594,590 | 6/1986 | Van Hatten et al. | 364/825.51 |
| 4,620,278 | 10/1986 | Ellsworth et al. | 364/200 |
| 4,627,018 | 12/1986 | Trost et al. | 364/900 |

OTHER PUBLICATIONS

Patent Abstracts of Japan, vol. 6, No. 84 (P-117) [962], 22nd May, 1982; & JP-A-57 23 132 (Nippon Denshin Denwa Kosha) 06-02-1982.

IBM Technical Disclosure Bulletin, vol. 20, No. 8, Jan. 1978, p. 3265, New York, U.S.A.; R. D. Pellinger: "User-Controlled Memory Cycle Complete Ending Sequence".

Electronic Design, vol. 33, No. 1, 10th Jan. 1985, pp. 335-338, 340, 342, 343, Hasbrouck Heights, N.J., U.S.A.; D. McCartney et al.: "The 32-Bit 68020's Power Flows Fully Through a Versatile Interface".

Primary Examiner—Thomas C. Lee
Attorney, Agent, or Firm—Robert M. Asher; Sewall P. Bronstein

[57] ABSTRACT

A computing system is disclosed which uses a system busy signal on its system bus to help control access to said bus. One or more requesters can generate a request signal when the system busy signal is not asserted. System busy is asserted along with the request signal(s) and remains asserted until all requesters which generated a request signal have gained access to the bus in order of priority. A freeze signal is generated on the system bus during the address phase of an instruction and a wait signal is generated during each data transfer in the data phase of an instruction. The freeze signal may be generated by a memory control unit, a memory module or a requester.

16 Claims, 11 Drawing Sheets

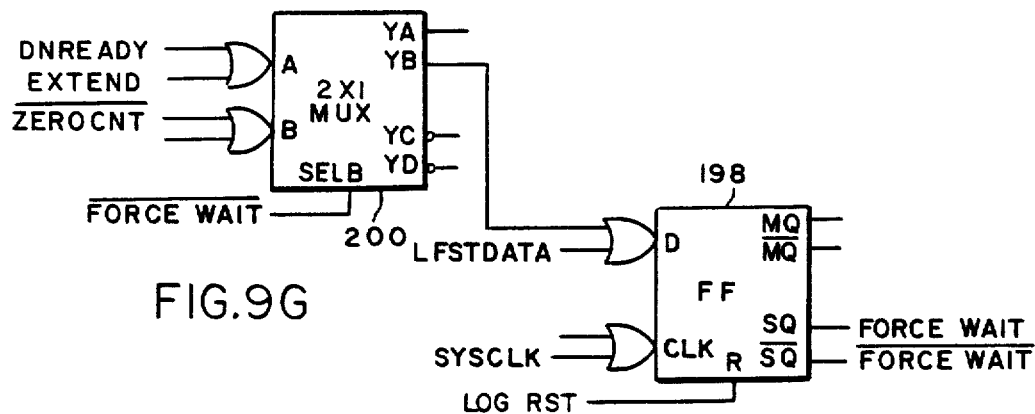
FIG.9G
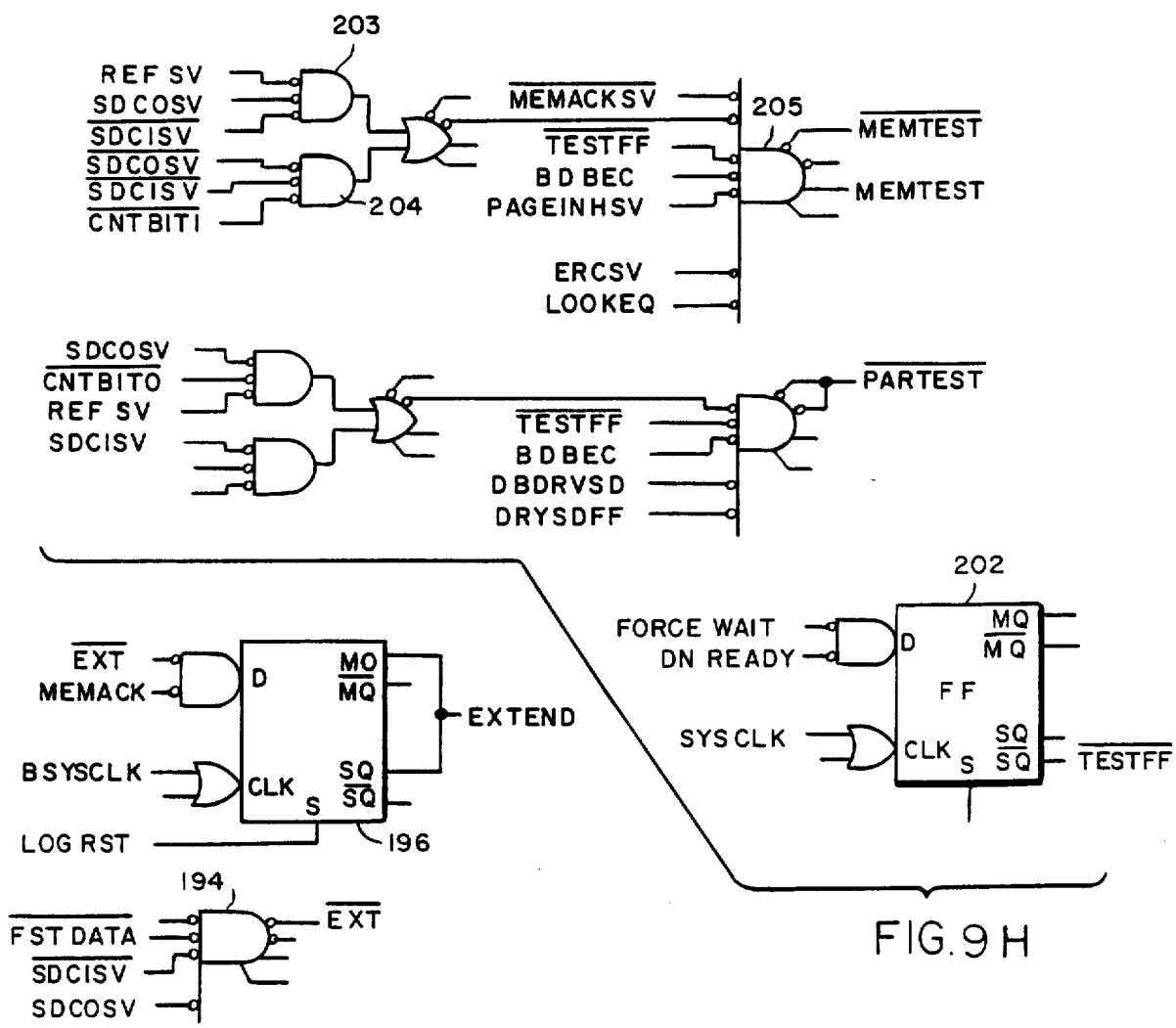
FIG.9F
FIG.9H

SYSTEM FOR CONTROLLING ACCESS TO COMPUTER BUS HAVING ADDRESS PHASE AND DATA PHASE BY PROLONGING THE GENERATION OF REQUEST SIGNAL

BACKGROUND OF THE INVENTION

This invention relates to a bus protocol which arbitrates and provides access to a system bus which is shared by a number of modules in a computing system. In particular, the invention relates to the protocol and the apparatus for implementing the bus protocol.

It is a common practice in computing systems in which there are a number of modules sharing a system bus to provide each module on the bus with a different priority. In some systems the priority of each module is fixed and in others a token passing system is provided in which priority is passed from one module to the next. In either of these systems of arbitrating use of the bus, a module having the highest priority may monopolize use of the bus line to the detriment of the lower priority modules. Such monopolization of the bus occurs regardless of the importance of the particular instructions being executed by the module having the highest priority on the bus. The performance of such systems may suffer when important instructions in modules having a low priority have to wait in order to be performed.

A system bus has lines for carrying addresses, commands, data and control signals between modules. Instructions are often delivered in a phase for the sending of an address with its command and a phase for the sending of data. Therefore, the data bus may be used in a separate operation at the same time that a new command is being sent out on the system address bus. Prior art systems often deligate the task of determining the beginning and end of a data phase or instruction phase to a single module in the computing system. This may tend to be a burden which slows the system as control signals are transferred back and forth to the assigned bus control module. It is an object of the present invention to distribute the control of bus access. It is a further object of the present invention to increase the ability of a system to take advantage of overlap between the system address and system data buses.

SUMMARY OF THE INVENTION

The present invention is directed to a method and apparatus which implements a unique bus protocol. The apparatus includes a plurality of requester modules on a system bus. A system clock defines a succession of clock cycles on the bus. Each requester may assert its request line in a clock cycle in which the system busy line is deasserted. Requesters which asserted their request line obtain access to the bus in order of priority. System busy is asserted by a requester when it asserts its request line. The system busy line is released by a requester when it starts to drive an instruction on the system bus. One clock later, the requester deasserts its request line. The system busy signal is carried on a wired OR line which is thus deasserted only after all requesters have stopped driving the system busy line.

The invention further provides a memory module and the requesters with means for driving a freeze signal during the address phase of an instruction. The freeze signal prolongs the address phase on the system bus. A wait signal is generated by a memory control unit during the data phase of an instruction. The freeze signal is carried by a wired OR line and the wait signal is carried on a totem pole line.

The present invention advantageously allows any requester to gain access to a bus regardless of its priority since all requesters that assert their request line when the system busy line is deasserted will get access to the bus. Thus, a high priority requester cannot monopolize the system bus simply because it has a high priority. A further advantage of the present invention is the enhanced performance made possible by distributing control over the freeze signal to the memory modules, and the requesters as well as the memory control unit.

Other objects and advantages of the invention will become apparent during the following description of the presently preferred embodiment of the invention taken in conjunction with the drawings.

DETAILED DESCRIPTION OF THE DETAILED EMBODIMENT

Figure 1:
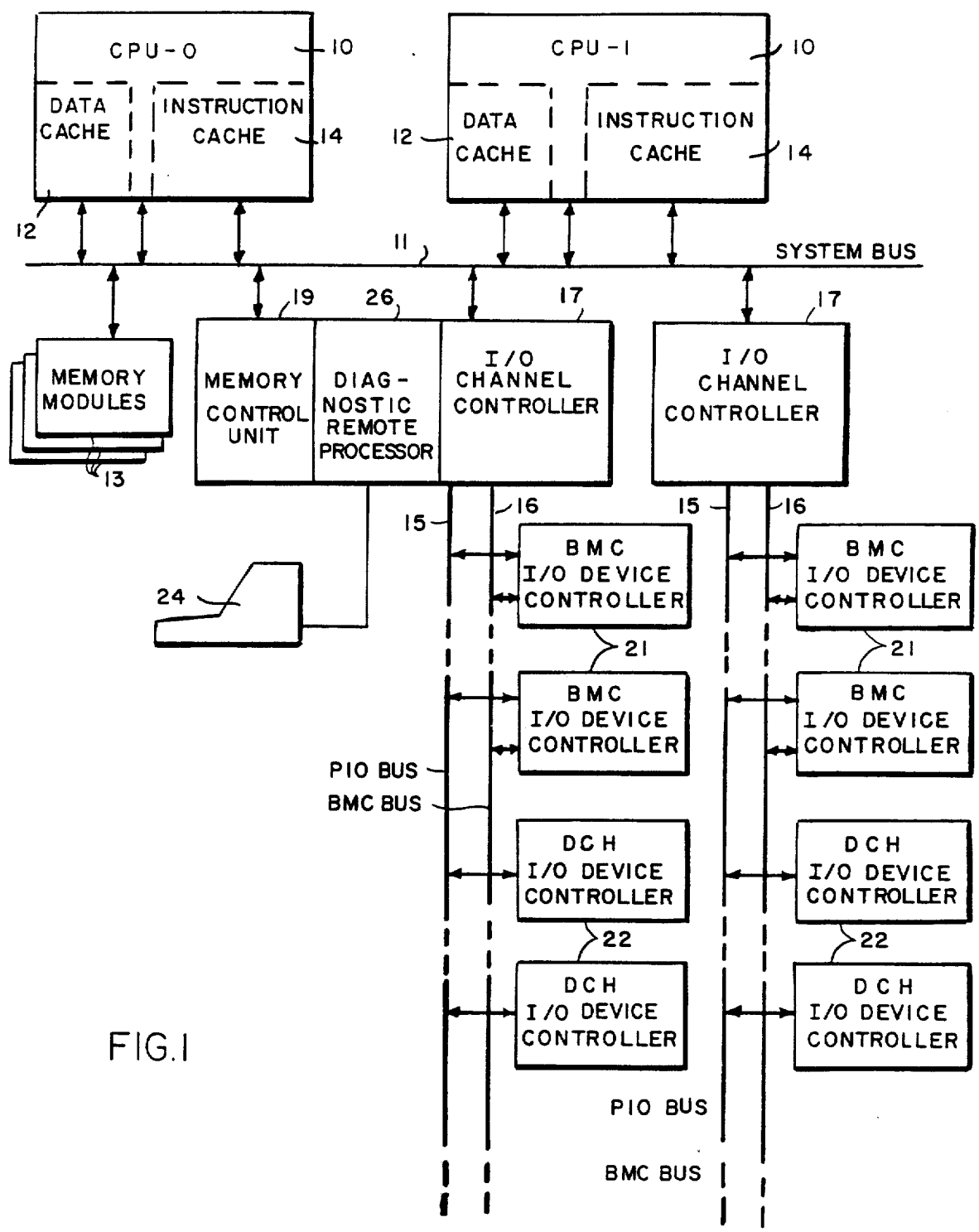
FIG. 1 shows a broad block diagram of an overall system making use of the present invention.

An overall system using the techniques of the invention is shown in FIG. 1 wherein one or more central processor units (CPU) 10 are interconnected via system bus 11 with one or more I/O channel controllers 17, a memory control unit 19 and at least one memory module 13. A CPU includes a data cache 12 and an instruction cache 14. In the preferred embodiment, these caches are write-through caches. Each cache may have a separate need to use the system bus, thus, each one has its own requester logic for gaining access to the bus. The I/O channel controllers interface with a programmed I/O DCH bus 15 and a BMC bus 16 for the transfer of data to and from external input/output device BMC (burst multiplexor channel) controllers 21 and DCH (data channel) I/O device controllers 22. The programmed I/O DCH bus 15 is in the presently preferred embodiment a NOVA ECLIPSE $^R$bus made by Data General Corporation of Westboro, Massachusetts. The BMC I/O device controllers 21 interface with both the PIO bus 15 and the BMC bus 16. The DCH device controllers 22 are connected only through the PIO bus 15. The memory control unit 19 monitors the activity on the system bus 11 and is responsible for correcting any correctible errors appearing in data retrieved from memory. An operator console 24 may be attached to the system through a diagnostic remote processor 26. In the presently preferred embodiment, the memory control unit 19, the diagnostic remote processor 26 and the first input/output controller 17 are all configured on the same module board. The diagnostic remote processor 26 runs diagnostic routines and interfaces with the operator console 24.

BUS PROTOCOL

In order to provide for an orderly use of the system bus by all of the modules and individual requestors that interface through it, the bus protocol of the present invention shall now be described with reference to the timing diagram of FIG. 2. A requester may be a data cache 12, an instruction cache 14, the memory control unit 19 or an input/output channel controller 17. The signals are shown inverted in FIG. 2. Many of the lines are open collector lines which logically results in an AND function being performed on the inputs to the line. The present embodiment of the invention wire ORs signals provided to a system bus line at more than one input. In order to achieve a wired OR line with open collector inputs, the signals are inverted when they are driven on the line.

A requester initiates a system bus operation by asserting its request line (SDREQx). Each requester is assigned a different priority request line. Access to the bus is regulated in part by the priority of the request line of a requester. In FIG. 2, the requester which generates SDREQ1 has priority over the lower priority requesters generating SDREQ2, SDREQ3 and SDREQ4.

A system busy line (SDBUSY) is provided in accordance with the present invention to help prevent a high priority requester from monopolizing the system bus. A requester may only assert its request line if the system busy line is not asserted. However, in a clock cycle when the system busy line is not asserted any number of requesters may assert their request line to obtain an opportunity to use the bus. In FIG. 2, SDBUSY becomes deasserted in clock cycle 2 which allows the requesters which want the bus to assert their request line in clock cycle 3. All of the requesters which asserted their request in the clock cycle when the system busy line was not asserted will have an opportunity in order of priority to obtain access to the system bus 11. This procedure prevents a high priority module from monopolizing use of the bus. The high priority module cannot reassert its request line until the system busy line has been deasserted. The system busy line will remain asserted until each of the requesters that was able to assert its request has finished its operation and deasserted the system busy line. The system busy line of the present invention is an open collector line carrying an inverted signal to act as a wired OR. The request lines are totem pole lines.

A requester asserts the system busy line at the same time that it asserts its request line. A requester continues to assert the system busy line until any higher priority requesters that have also made a request in the same clock cycle have all completed their operations. Once a requester has the highest priority, it deasserts the system busy line and starts its address phase, sending an address out over the address lines of the system bus. However, system busy will remain asserted if other lower priority requesters are still waiting their turn and are therefore driving the system busy line. One clock after deasserting system busy, the requester then deasserts its request line.

At the beginning of the address phase, a requester that has obtained priority drives the address lines and the command lines (SDC) of the system bus and in addition drives a freeze line (FREZ). There are three command lines in the presently preferred invention which define seven operations and is all zeros to indicate no operation (no-op). The freeze line informs the memory control unit 19 and the memory modules 13 that a new address phase has begun. The requester drives freeze for only one system clock. The memory control unit 19, a cache or a memory module 13 may be occupied with other activities and may need to extend the address phase to give it an opportunity to examine the new address in a later clock period. The address phase is extended when any module drives the freeze line to keep it asserted. The memory control unit 19 drives the freeze line to allow data transfers in progress to complete before others are allowed to start. The address phase would also need to be extendible if it is in progress when the memory control unit 19 is performing an error correction. The assertion of the freeze line prevents an address phase from ending, thus, a transfer involving a plurality of data transfers may continue until it is completed. In the case of an error correction, the address phase is extended until corrected data is driven on the data lines. When the last word of data is driven, the memory control unit will deassert FREZ. The freeze line like the system busy line is an open collector line.

In the presently preferred embodiment, a WAIT signal line is also provided. The WAIT line is a totem pole line which can only be asserted by the memory control unti 19. The presently preferred embodiment also provides an error line (ERCC) by which the memory control unit 19 can inform the memory of an error and tell the memory module to get off the bus 11. WAIT is not sent to memory, it is sent to the requesters to inform them that the data phase is being prolonged. A requester cannot start a new address phase until the pending data phase has been completed. To start an address phase the freeze line and the WAIT line must be deasserted or FREZ must be unasserted for two consecutive clocks. The WAIT line may therefore prolong a requester's address phase if a memory data error is discovered. WAIT is asserted by the memory control unit 19 at the beginning of each data phase and remains asserted until the memory control unit 19 determines valid data is ready to be transferred. When data is put on the data bus WAIT is deasserted unless the memory control unit detects an error. If there is an error, the error signal is asserted and WAIT remains asserted until the corrected data is driven on the data bus as shown in clock cycles 19 and 20 in FIG. 2. FREZ is too slow of a signal to be used to extend the address phase when there is an error. Therefore, the totem pole WAIT line is desirable. FREZ is a slow line because it is connected to a large number of modules for input and output. The WAIT line on the other hand is only driven by the memory control unit 19 and is only sent to the requester. The fewer connections and less required conductive etching makes WAIT a faster signal. WAIT can be asserted in response to an error even though the error is not discovered until late in a clock cycle. The assertion of WAIT keeps further requesters off the address lines.

If a computing system is provided with double bit error correction in the memory control unit 19 as does the preferred embodiment, then a bus inhibit signal (BUSINH) will be included for transmission by the memory control unit. In the preferred embodiment, a double bit error can only be corrected if there is a hard error in the memory from which the data was taken. A double error caused by a hard error can be corrected by known methods in the art by having the module responsible for the correction manipulate the data and do a write back to the memory location. Double bit error correction is not a part of the present invention and has been described in many texts. Any method of double bit error correction known to those in the art may be used in conjunction with the present invention.

A bus inhibit signal will cause a requester that has driven an address on the address lines to be removed from the address lines one clock cycle after the assertion of the bus inhibit line. The system is made aware that a double bit error correction is being attempted and that the bus is needed for that purpose. Upon deassertion of the bus inhibit line that requester will re-enter the address phase and place its address back out on the bus. The requester will also then reassert FREZ for one clock signal.

Figure 2:
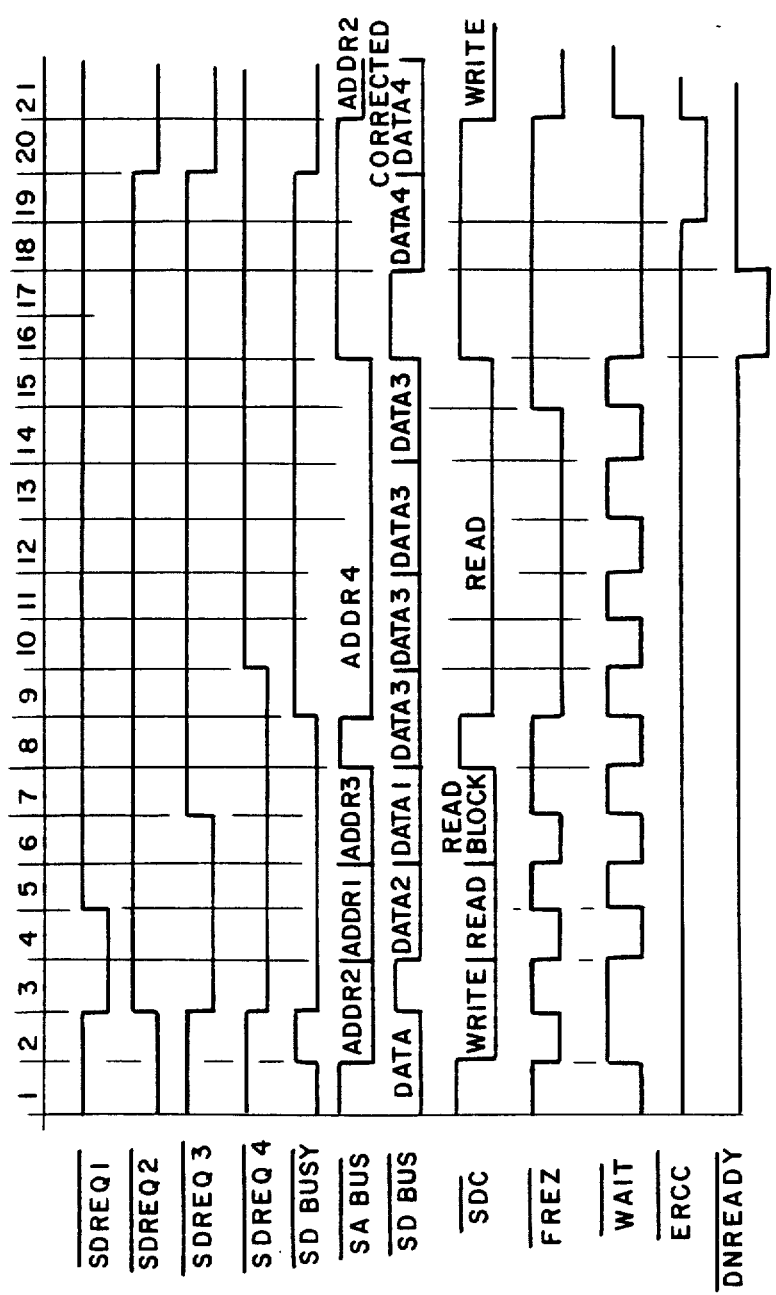
FIG. 2 is a timing diagram of signals on a system bus of the present invention.

If a second requester enters the address phase while a first requester is in its data phase the memory control unit 19 will assert the freeze line as shown in clock cycles 10 to 14 of FIG. 2. The freeze line is asserted until the last system clock of the data phase. Upon deassertion of the freeze line, the second requester can immediately start its data phase as the first requester ends its data phase. This enables maximum utilization of the data lines of the system bus thereby providing a faster system.

In a memory read operation, memory asserts a data not ready signal (DNREADY) until it is ready to place the first addressed word on the system bus. The memory control unit 19 asserts WAIT as soon as the data phase begins and maintains the assertion of WAIT while data is not ready as shown in clock cycles 16–18 of FIG. 2. On the clock following the deassertion of DNREADY, the memory control unit 19 will check the data put on the bus for errors in a conventional manner. If an error is found, the memory control unit continues to assert the WAIT signal. An error signal (ERCC) will also be asserted to tell memory to discontinue driving data onto the system bus. The memory control unit 19 then has the opportunity to correct the error and drive corrected data onto the bus, as shown in clock cycles 20 and 21. WAIT is asserted during the entire correction phase. Upon providing corrected data on the system bus, the memory control unit will deassert WAIT. This informs the requester that the data is now valid. Thus, a requester performing a read operation monitors the wait line and will not take data from the data lines until WAIT has been deasserted.

In a write operation, or a system data transfer from one module to another, a requester will drive data on the system bus starting on the trailing edge of the address phase. Data will continue to be driven until the WAIT signal is deasserted by the memory control unit. Deassertion of WAIT indicates that the memory or receiving module is ready to accept the requester data. If a parity error occurs in a write or system data transfer between modules, a write abort signal will cause the memory module to cancel the operation by performing a read operation instead of a write. The requester driving data on the bus continues to drive the data until WAIT is deasserted by the memory control unit 19. The system will handle the occurrence of this error which is not correctible as a fatal error.

BUS ARBITRATION

Figure 3:
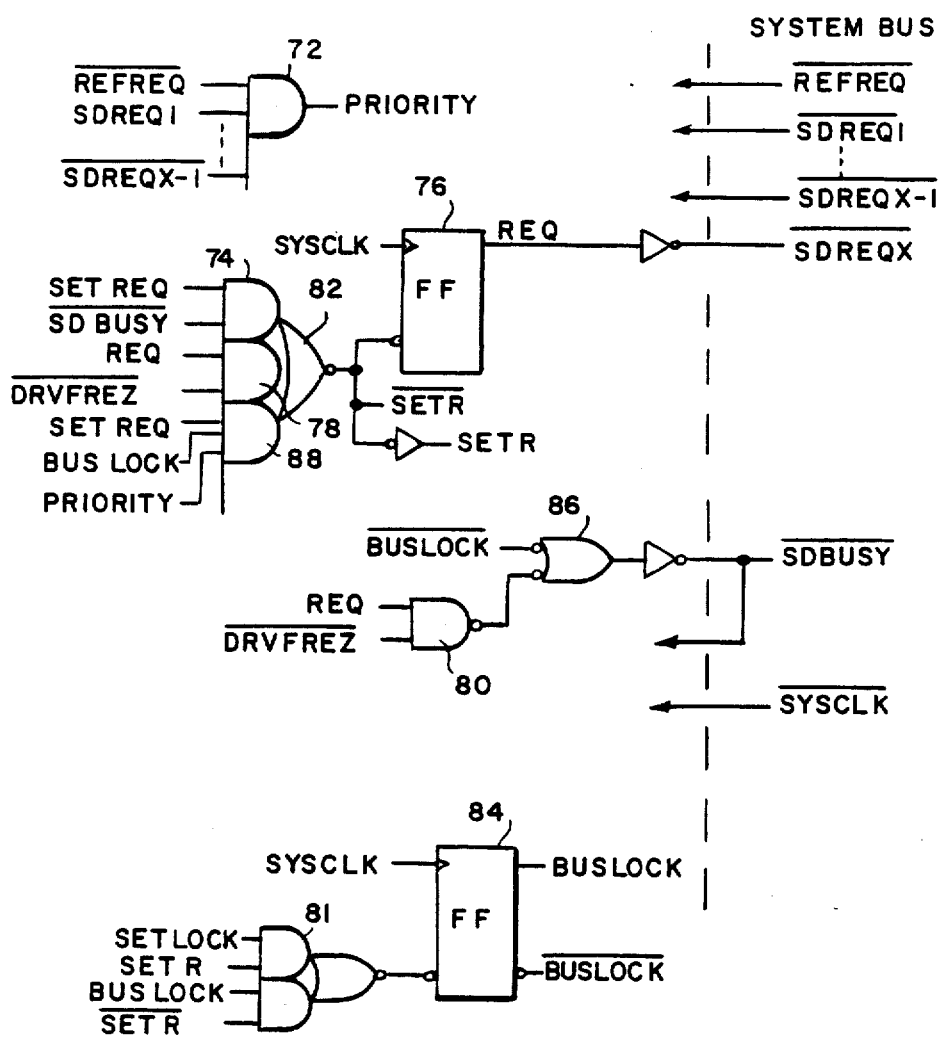
FIG. 3 is a schematic logic diagram of the bus arbitration logic of the present invention found in a requester of the system of FIG. 1.

Each requester in the computing system is provided with logic which monitors the system bus 11 and determines when that requester has priority to control the system bus and send out instructions and data over the bus. The logic of the presently preferred embodiment for performing bus arbitration in accordance with the bus protocol of the present invention is shown in FIG. 3. When a requester wishes to obtain access to the system bus, it internally asserts the signal SETREQ. However, in accordance with the bus protocol of the present invention, access to the bus cannot be obtained unless the system busy signal is not asserted. During a clock cycle in which SDBUSY is not asserted any number of requesters may assert their request lines. If SDBUSY is not asserted and the requester wants to obtain access to the system bus, SETREQ will assert AND gate 74 and consequently flip-flop 76. Flip-flop 76 asserts REQ in the next clock cycle. REQ will cause the request line to be asserted and SDBUSY to be asserted.

All requesters which have asserted their request line during that clock period will be on a queue in order of their priority for accessing the system bus. Each requester has an AND gate 72 which determines whether it has priority. For each requester, the request line of each of the higher priority requesters is provided into AND gate 72. Priority is asserted by a requester when each of the higher priority requesters is not asserting its request line. In the presently preferred embodiment, the highest priority request is caused by a refresh cycle initiated by the request signal REFREQ. Refresh is a method well known in the art for refreshing the capacitors at the locations of memory.

REQ is combined with an internal drive freeze signal DRVFREZ at AND gate 78. Once REQ has been asserted gate 78 will cause REQ to remain asserted until the requester has priority and has entered the address phase. When the requester enters the address phase, it asserts DRVFREZ which will deassert gate 78 and will cause flip-flop 76 to deassert the request line at the next clock. DRVFREZ is also provided to gate 80 which will immediately deassert the system busy line. The generation and use of DRVFREZ in the address phase is discussed in the section on address phase logic below.

There are certain situations in which a requester will need the bus for an extended period of time because of a high priority instruction which requires the completion of a number of instructions. A semaphore is an example of such an extended instruction. Under these circumstances in which an extended use of the bus is required a requester asserts the signal SETLOCK. SETLOCK is combined with a SETR signal at AND gate 81. SETR is asserted by OR gate 82 when a requester is permitted to assert its request line. A combination of SETLOCK and SETR will assert BUSLOCK through gate 81 and flip flop 84. At the completion of one operation in a series required for a semaphore, SDBUSY will not be deasserted as usual because of BUSLOCK at OR gate 86. Therefore, SDBUSY will remain asserted and the combination of BUSLOCK, PRIORITY and SET REQ at AND gate 88 will cause the request line to remain asserted for the next operation in the semaphore. A bus locked set of instructions may be interrupted by a higher priority request such as REFREQ. The presently described system gives REFREQ the highest priority and allows assertion of REFREQ even during an SDBUSY. Thus, after each operation it is necessary to check for priority even though priority existed at the beginning of the semaphore. In the last operation of a bus locked sequence, SETLOCK will no longer be asserted so when SET R is asserted, the combination of BUSLOCK and not SETR at gate 81 will cause BUSLOCK to be reset. The reset occurs when the last operation has priority to proceed as determined in gate 88 which asserts SETR. Henceforth, this last operation will be handled in a normal manner.

ADDRESS PHASE LOGIC

Figure 4:
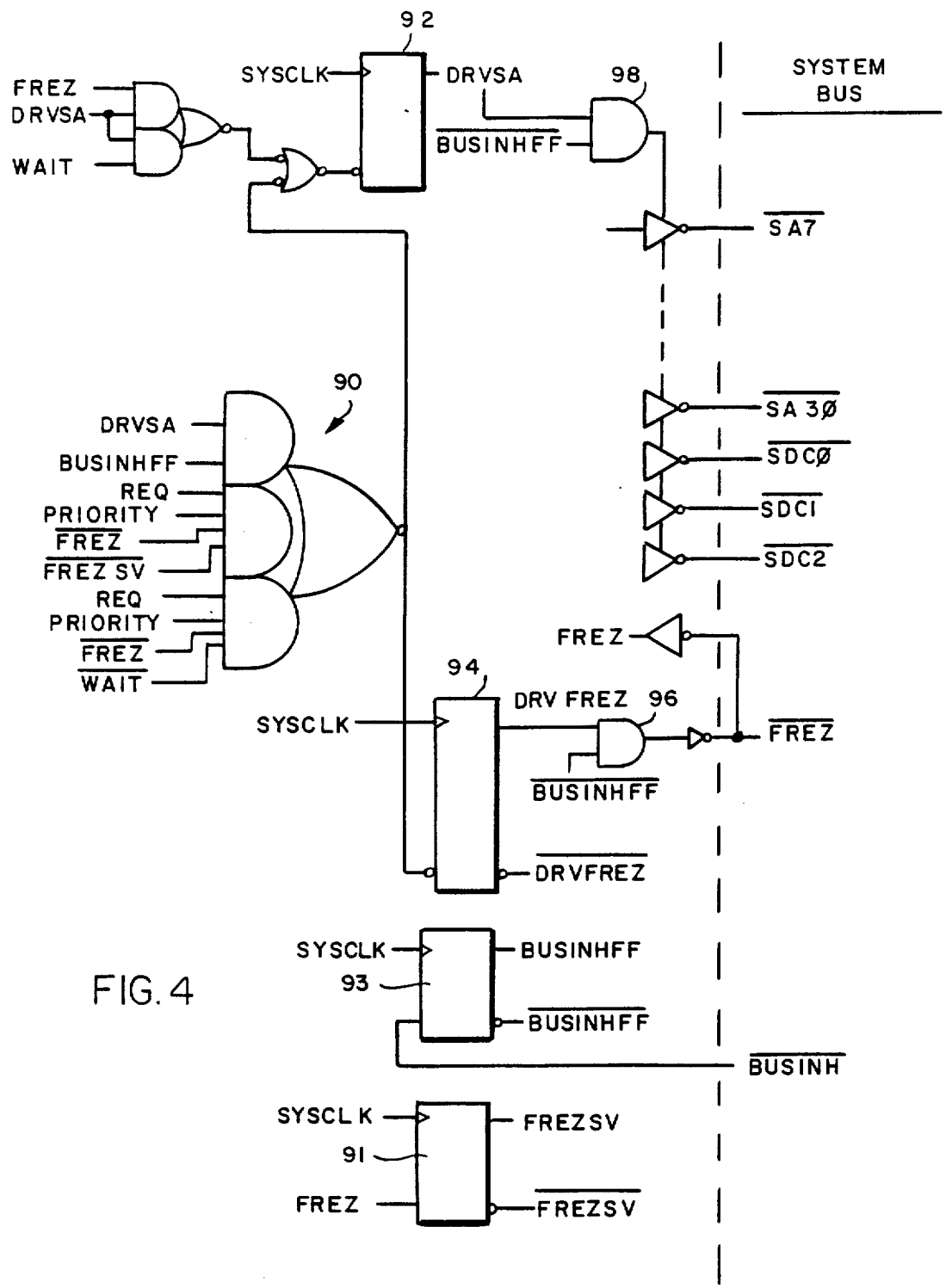
FIG. 4 is a schematic diagram of the address phase logic of the present invention found in a requester of the system of FIG. 1.

Once a requester determines it has obtained priority for accessing the system bus, it may then go into its address phase. The address phase logic for a requester is shown in FIG. 4. The address phase is entered as shown at combination gate 90. Two of the requirements for commencing an address phase are that the requester is asserting a request as indicated by REQ and the requester has priority both of which were determined in the bus arbitration logic. It is also necessary to check that the freeze signal (FREZ) is not being asserted since any module can assert the FREZ signal over the system bus to extend the previous address phase. A requester may not start its address phase until the previous requester has completed its address phase. When an address phase is completed a data phase will immediately commence. Therefore, in addition to the freeze signal, the WAIT signal is a criterion for starting an address phase. An address phase can begin if both WAIT and FREZ are deasserted. If WAIT were still asserted, it would mean that the data phase is being extended to perform an error correction or block transfer. It is also possible to start a new address phase if the freeze signal and a freeze save signal (FREZSV) both are not asserted. The freeze save signal is a one clock delayed version of the freeze signal produced in flip flop 91. The combination including the freeze save signal would permit an address phase to begin in a situation such as that at clock cycle 8 of FIG. 2 where WAIT was asserted in a second data phase of a block transfer but no address phase was in progress.

Upon meeting the conditions for beginning an address phase, flip-flop 92 causes the assertion of a drive address signal (DRVSA) and flip-flop 94 causes the assertion of DRVFREZ. The DRVFREZ signal is used by the bus arbitration logic of FIG. 3 to deassert SDBUSY. When the requester asserts DRVFREZ, gate 96 will normally assert FREZ. FREZ will be fed back into gate 90 and thus the flip-flop 94 will reset DRVFREZ. Thus, a requester only drives the freeze signal for the first clock cycle of an address phase. The DRVSA signal, however, which is causing the address lines to be driven by the requester will continue to be asserted if FREZ is driven by some other module or if WAIT is asserted. FREZ can be driven by a module which needs more time before reading the address lines. If an instruction is pending while a new address phase is being requested, the memory control unit will assert FREZ until the last data word is transferred. However, if there is an error on the last data transfer, since FREZ is slower to respond to an error than WAIT, it becomes necessary to check the WAIT signal before discontinuing to drive the address signals on the address lines. Therefore, an address phase is not completed until both FREZ and WAIT are deasserted.

The bus inhibit signal (BUSINH) is a signal which may be provided in a system to help implement double bit error correction. The bus inhibit signal is provided to return a requester in the middle of its address phase back to the point when it was about to commence its address phase. Bus inhibit causes the requester to stop driving signals on the address and command lines. Thus, the requester is taken off the system bus. The requester will be able to regain access to the system bus and restart its operation at the completion of the double bit error correction and deassertion of the bus inhibit signal. The bus inhibit signal is saved to provide a one clock delayed version, BUSINHFF in flip flop 93. The saved bus inhibit signal in combination with DRVSA at gate 90, sets flip flop 92 and flip flop 94. Thus, the requester is ready to assert DRVSA and DRVFREZ, the clock after the bus inhibit signal is deasserted. The deassertion of bus inhibit is fed into gate 96 and gate 98 to enable FREZ and the address lines.

REQUESTER DATA PHASE

Figure 5:
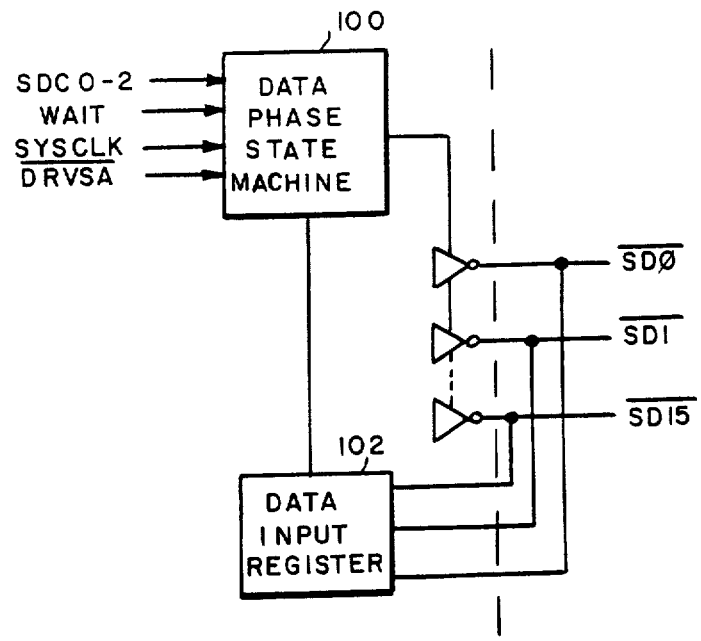
FIG. 5 is a schematic diagram of the data phase logic of the present invention found in a requester of the system of FIG. 1.

A requester begins its data phase immediately upon completing its address phase. The data phase shall be described with reference to FIG. 5. This can be simply determined by feeding the drive address signal, DRVSA, into a data phase state machine 100. Upon deassertion of DRVSA, the data phase state machine 100 enables the data line drivers if the command as determined by signals SDC 0-2 from the command lines involved a write operation. If the command involves a read then data is taken off the data lines into a data input register 102.

A data phase is not completed until the deassertion of the wait signal. Therefore, WAIT is input into the drive phase state machine 100. When WAIT is asserted the data line drivers remain enabled or the data is not taken off the data lines into the data input register depending upon the instruction which is pending. In a write operation after the deassertion of WAIT the data line drivers are shut off. For a read operation, the deassertion of WAIT causes the data, which must now be valid, to be taken off the date lines and into the data input register 102.

MEMORY MODULE

Figure 6:
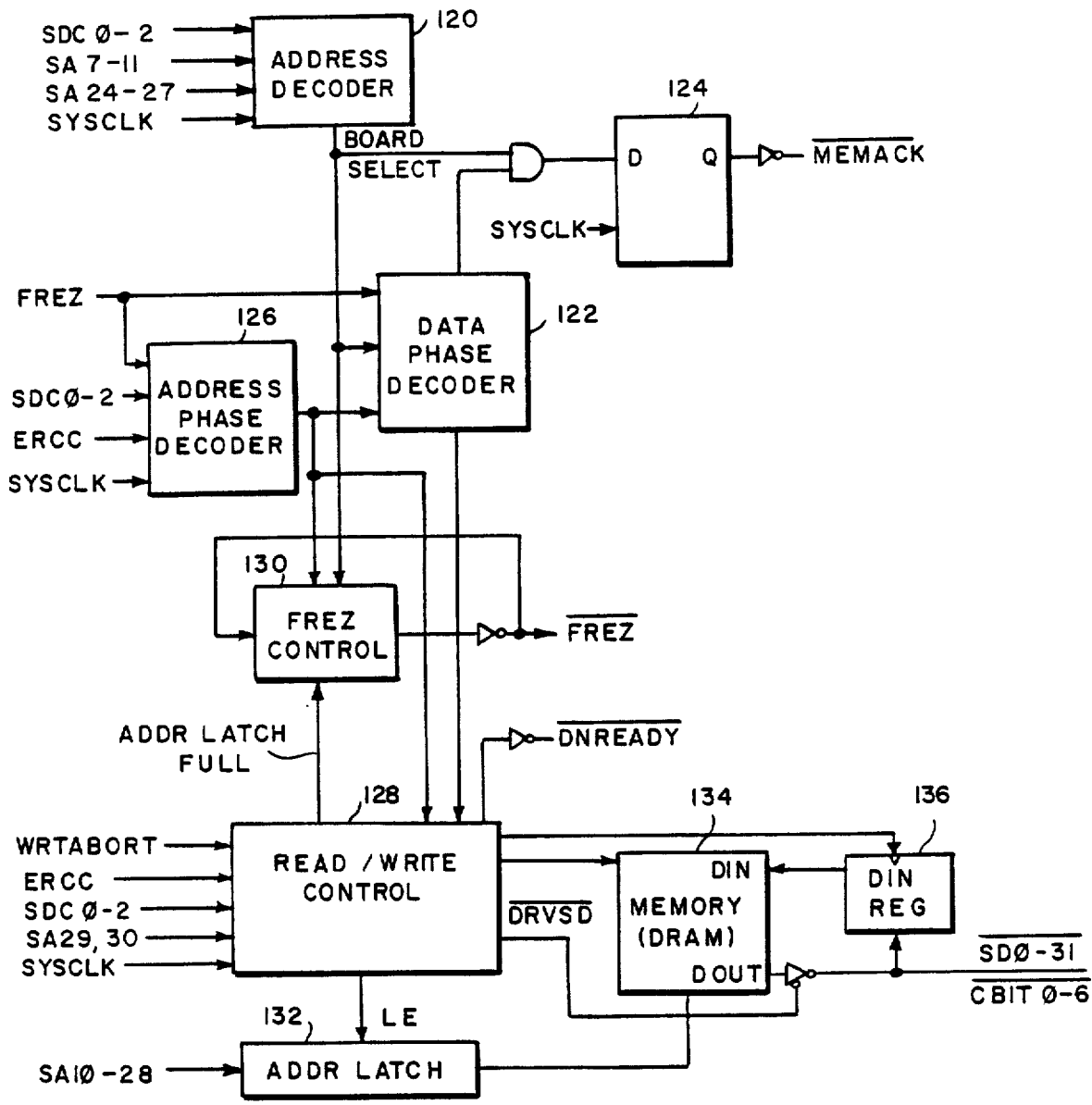
FIG. 6 is a schematic diagram of the bus access logic of the present invention of a memory module of the system of FIG. 1.

Referring now to FIG. 6, a simplified schematic of a memory module's bus access logic is illustrated. An address decoder 120 receives the command signals (SDC) and the necessary address signals (SA) from the system bus to determine whether this particular memory module has been selected by the operation pending on the system bus. Selection of the memory modules depends on whether the command is a memory instruction and if so whether the memory module is the one addressed. If the module is selected, a board select signal is asserted. At the beginning of a data phase as determined by a data phase decoder 122, flip-flop 124 asserts MEMACK if board select is asserted. The data phase decoder 122 determines that the data phase is beginning by obtaining from an address phase decoder 126 when the address phase ends. An address phase ends when FREZ is not asserted and the error line (ERCC) is not asserted. The data phase commences immediately following the end of the address phase.

If the memory module has been selected, it is important that the memory module have an opportunity to take the full address off the system bus for its use in performing the prescribed operation. In order to keep the address on the address lines, the memory module of the present invention can assert FREZ. The FREZ signal prolongs the address phase of a requester. The memory module includes a read/write control 128 which generates a signal if the address latch 132 is full and is unable to accept the address on the system bus at the present time. A FREZ control 130 generates the FREZ signal if the address latch is full, and the memory module has been selected. FREZ is generated after the address phase has been entered and after the first clock cycle of the address phase. For the first clock cycle of the address phase, the requester is generating the FREZ signal.

The read/write control receives a write abort signal (WRTABORT) which is useful in a double bit error correction. If a system includes double bit error correction, it is desirable that the memory module be able to abort a write and restart it later after the double bit error correction has been completed. The write abort signal may also be used when there is an address parity error to prevent a write into the wrong address. Also used in the double bit error correction is the ERCC signal which tells a read/write control 128 to stop sequencing through its memory array and get off the bus. The read/write control 128 controls the addressing of the memory in conjunction with the address latch 132.

The read/write control 128 is the source of the data not ready signal (DNREADY) which will be issued upon commencement of the data phase when the memory module is selected for a read unless the module has the addressed data ready to drive on the data lines. When data not ready has been asserted, it will be deasserted after the memory module accesses the requested data from RAM 134 along with the data's associated check bits (CBIT) for error detection and correction. A data input register is provided for taking data and check bits off of a bus and holding them stable for two clocks until they are written into the memory 134 during a write operation. In the presently preferred embodiment, memory 134 is a dynamic RAM of 264K. However, the invention may be practiced with any type or size of memory. Indeed, the bus protocol of the present invention advantageously provides flexibility to allow a slower memory since FREZ can be generated to prolong the address phase and DNREADY can extend the data phase on the system bus.

REQUESTER LOGIC FOR DRIVING FREEZE

Figure 7:
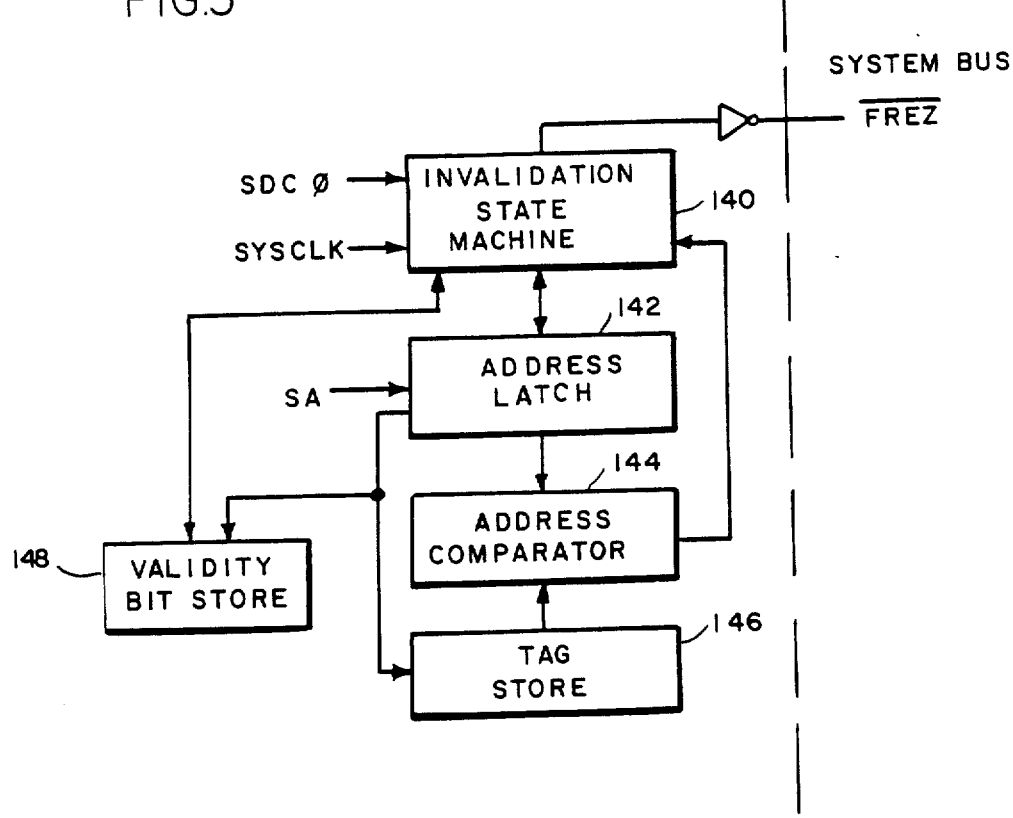
FIG. 7 is a simplified schematic diagram of the freeze generation logic of the present invention of a requester of the system of FIG. 1.

According to the distributed control over the freeze signal of the present invention, an instruction cache 14 and a data cache 12 may generate FREZ to delay an address phase if the cache cannot presently do its invalidation procedure on the new address. It is well known in the art to provide write through caches with a mechanism for invalidating data it has stored if the corresponding memory location is being written into. Referring now to FIG. 7, an invalidation state machine 140 is provided to control the invalidation procedure. An address latch 142 takes an address off the system bus if the operation is a write as determined by the command bits taken off the bus by the invalidation state machine 140. A tag store 146 contains a tag for each storage location in the cache. The tag indicates which page in a memory module the data in the cache was taken from. An address comparator 144 determines whether the addressed memory location corresponds to any of the page addresses in the tag store. A validity bit store 148 contains a bit for each storage location in cache to indicate whether the data stored in cache remains valid. If a write is performed on a memory location corresponding to a cache storage location, the validity bit for that cache storage location will be made invalid.

In accordance with the present invention, in a situation in which address latch 142 is full when a new write operation is driven on the address bus, the cache generates FREZ to prolong the address phase until the cache can take the address into its latch 142 to complete its invalidation procedure. The invalidation state machine 140 can generate FREZ under these conditions using any appropriate logic gates determinable by one of ordinary skill in the pertinent art.

FREEZE SIGNAL GENERATION BY THE MEMORY CONTROL UNIT

Figure 8:
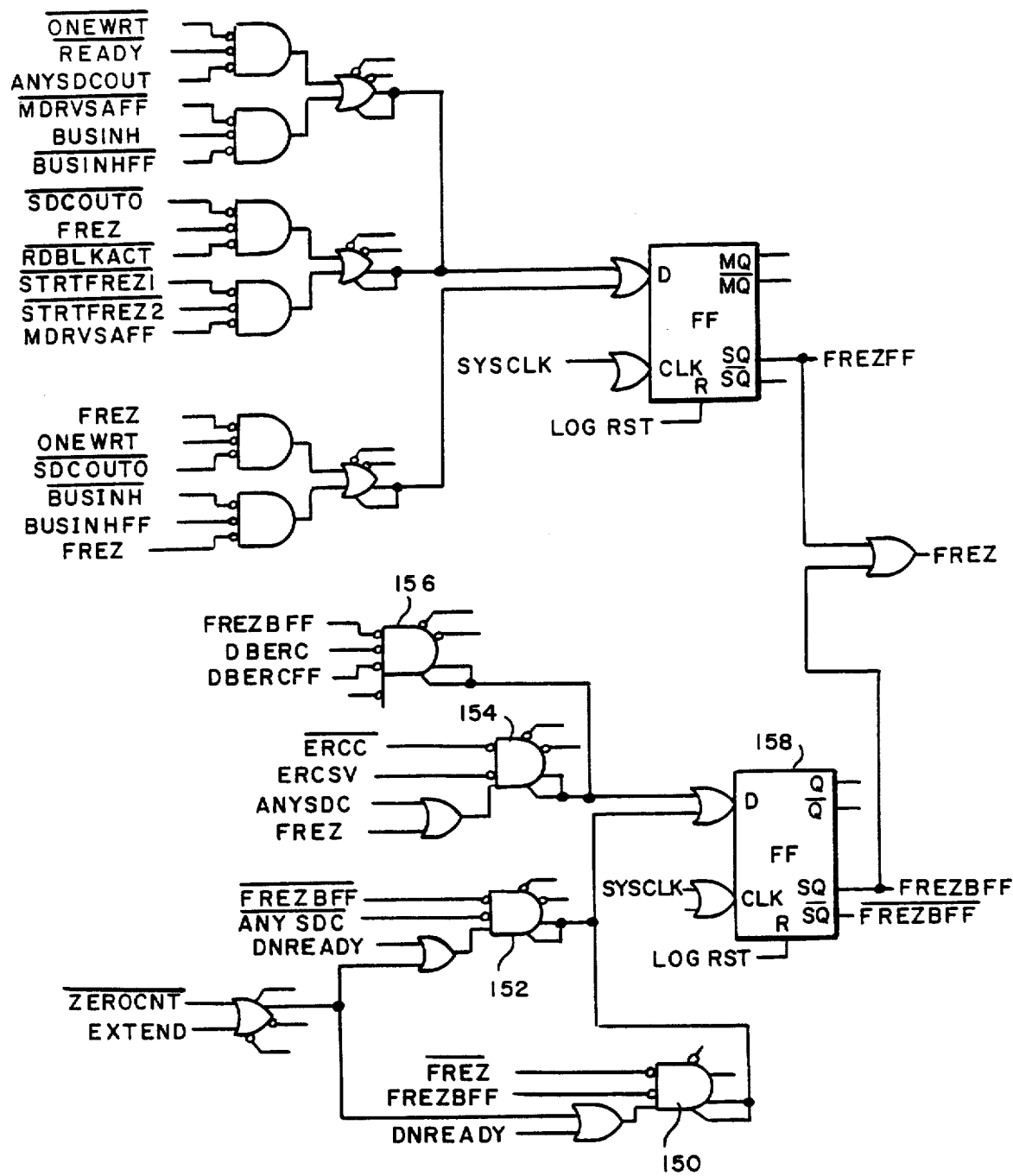
FIG. 8 is a schematic logic diagram of the freeze generation logic of the memory control unit of FIG. 1.

Referring now to FIG. 8, the logic within a memory control unit for the generation of FREZ is illustrated. Much of the logic shown refers to the generation of FREZ during a double bit error correction. Since the double bit error correction is not a part of the present invention, this logic will not be described further herein. It is sufficient to state that the memory control unit 19 can generate FREZ whenever necessary during a double bit error correction by making FREZ dependent on the appropriate signals. FREZ is also generated by a memory control unit in order to perform a sniff operation. Sniff is performed by the memory control unit 19 to detect and correct errors in memory locations which may have occurred as a result of an alpha particle hit. The signal FREZFF is generated as a result of appropriate signals indicating a double bit error correction or a sniff operation.

Memory control unit 19 is responsible for generating FREZ when an address phase is begun during a prolonged data phase caused by a block instruction for instance, a block read is shown requested by the third requester in FIG. 2. Gate 150 determines that it has not started generating FREZ yet through flip flop 158, and either data is not ready or there is no memory at the location addressed (EXTEND) or there is a block transfer with more than one data word remaining to be transferred as indicated by not ZEROCNT. The FREZ command will stay generated on the bus through gate 152 as long as the pending command 152 remains valid and until the data is ready, the block transfer reaches the last word (ZEROCNT asserted) or EXTEND is deasserted depending on which of these caused the FREZ. Since it is possible for a requester to abort an instruction by altering its drivers to drive a no-op rather than the command that was originally driven, it is desirable for the memory control unit to check whether there is a valid command on the line so as not to tie up the address lines with a no-op or an invalid instruction. An instruction abort might occur in a situation where data cache is being addressed but it is learned that the memory in the cache is no longer a valid representation of what exists in the actual memory. The requester which attempted this short cut of seeking memory from the cache rather than directly from memory aborts its instruction because the requester does not have sufficient time to reformulate the instruction to seek the data from the memory rather than the cache.

Generation of FREZ by the memory control unit must also occur to cover the situation where an error correction occurs on the last transfer of a word in a block transfer of a number of words in a data phase. FREZ is deasserted at the last data word and is thus deasserted while the correction is being made and the corrected word is being placed on the system bus by the memory control unit. Thus, it may be possible for another module to start its address phase because of two consecutive clock cycles without a FREZ. To prevent such an occurrence the memory control unit generates FREZ through gate 154. Gate 154 will cause FREZ to be generated if the error signal is asserted, the error signal was not asserted in the last clock cycle (ERCSV) and there is a valid command on the system bus or FREZ is asserted on the bus. Gate 156 handles double bit error situation.

GENERATION OF WAIT SIGNAL BY MEMORY CONTROL UNIT

The WAIT signal is asserted by the memory control unit 19 at the beginning of a data phase and remains asserted until the data placed on the data lines is determined to be valid and correct. If a command is passing a block of words of data, WAIT is deasserted after each data work is validly transferred over the system bus. WAIT is reasserted when the data lines are prepared to commence transfer of the next word of data. The logic used in the presently preferred embodiment of the memory control unit for generating WAIT is shown in FIGS. 9 A-I.

Figure 9A:
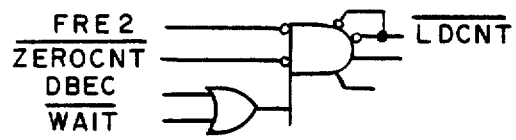
FIGS. 9 A-I are schematic logic diagrams of the wait signal generation of the memory control unit of FIG. 1.

A first component of the WAIT signal is a load count signal (LDCNT), generated as shown in FIG. 9A. The load count signal indicates that the system is either at the beginning of a data phase or the bus is idle. The load count signal is asserted if the system is not in the middle of a data phase (ZEROCNT), the address phase is not being extended by a FREZ signal, the system is not in the middle of a double bit error correction cycle (DBEC) and the last data phase has been completed (not WAIT). If the count is other than zero then the system is in the middle of a block transfer involving more than one data word and thus we are in the middle of a data phase. The data phase will not begin until FREZ has been deasserted, thus load count will not be asserted while FREZ is asserted. DBEC is a signal which indicates that a double bit error correction is taking place. The details of handling double bit error correction forms no part of the present invention, except to the extent that the system of the present invention provides a protocol which can make allowances for the delays caused by double bit error correction. If WAIT is presently being asserted, the present data phase has not yet been completed. A new data phase cannot begin until the old data phase has been completed as indicated by the deassertion of WAIT.

Since the load count signal is used to indicate the beginning of a data phase, it is also used to load the counter which is used when an instruction such as a block instruction requires the transfer of more than one word of data. Load count is also used as a criteria for a first data signal (FSTDATA).

Figure 9B:
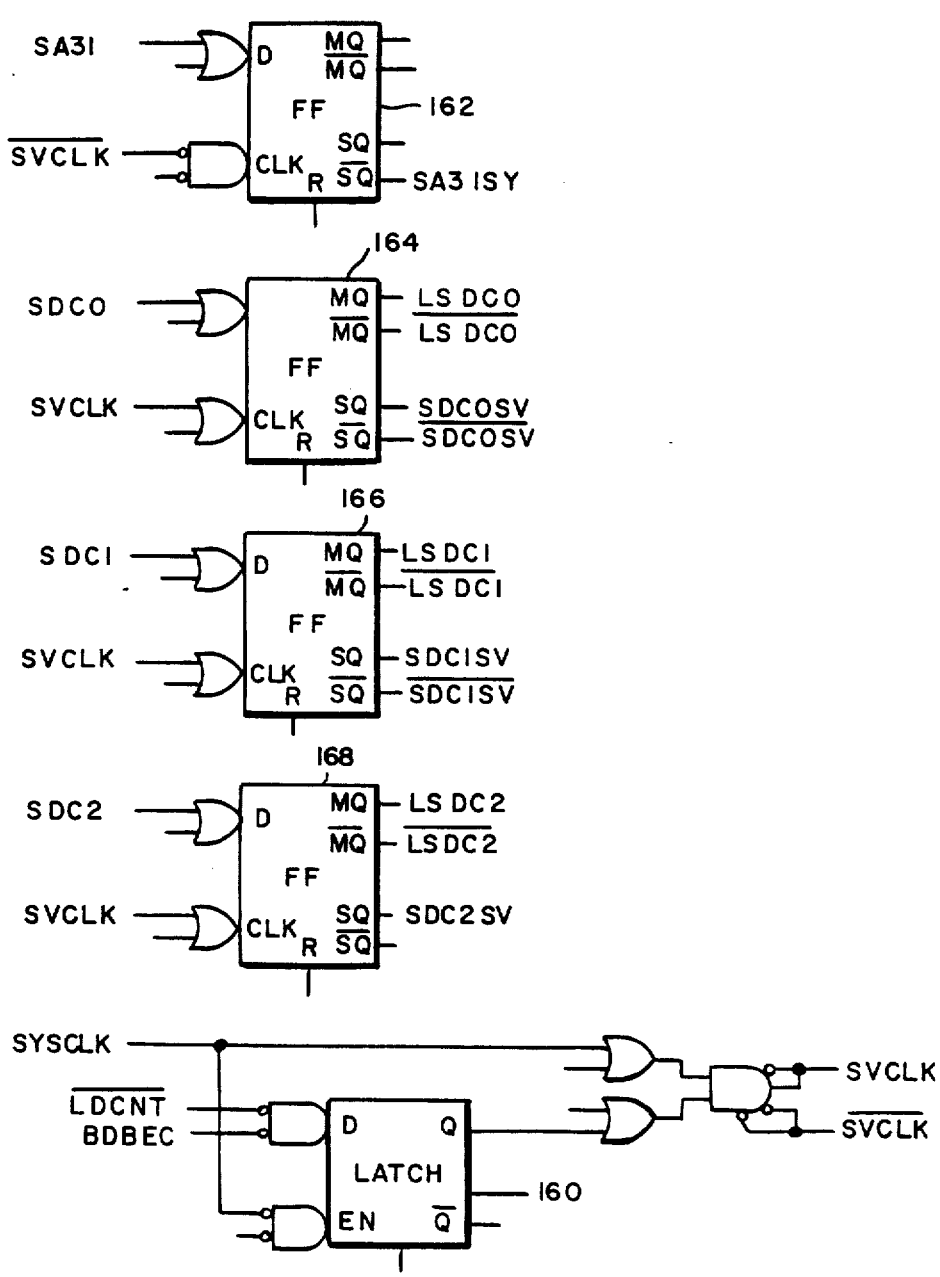

The presently preferred embodiment provides for eight commands which are coded into three command bits, SDC0, SDC1 and SDC2. Referring now to FIG. 9B, it is desirable to save the command during the data phase in addition to some address bits which will be useful at the completion of the data phase. A save clock signal (SVCLK) is generated which remains asserted during the data phase. As shown at latch 160, SVCLK becomes asserted in synchronization with the system clock (SYSCLK) when there is a load count signal asserted. The latch 160 also prevents the assertion of SVCLK when there is a double bit error correction as indicated by the signal BDBEC. The SVCLK signal is used in latch 162 to save an appropriate address signal throughout the data phase. In the preferred embodiment, address signal SA 31 is saved as signal SA31SV. Additionally, all of the command bits are saved in latches 164, 166 and 168.

Figure 9C:
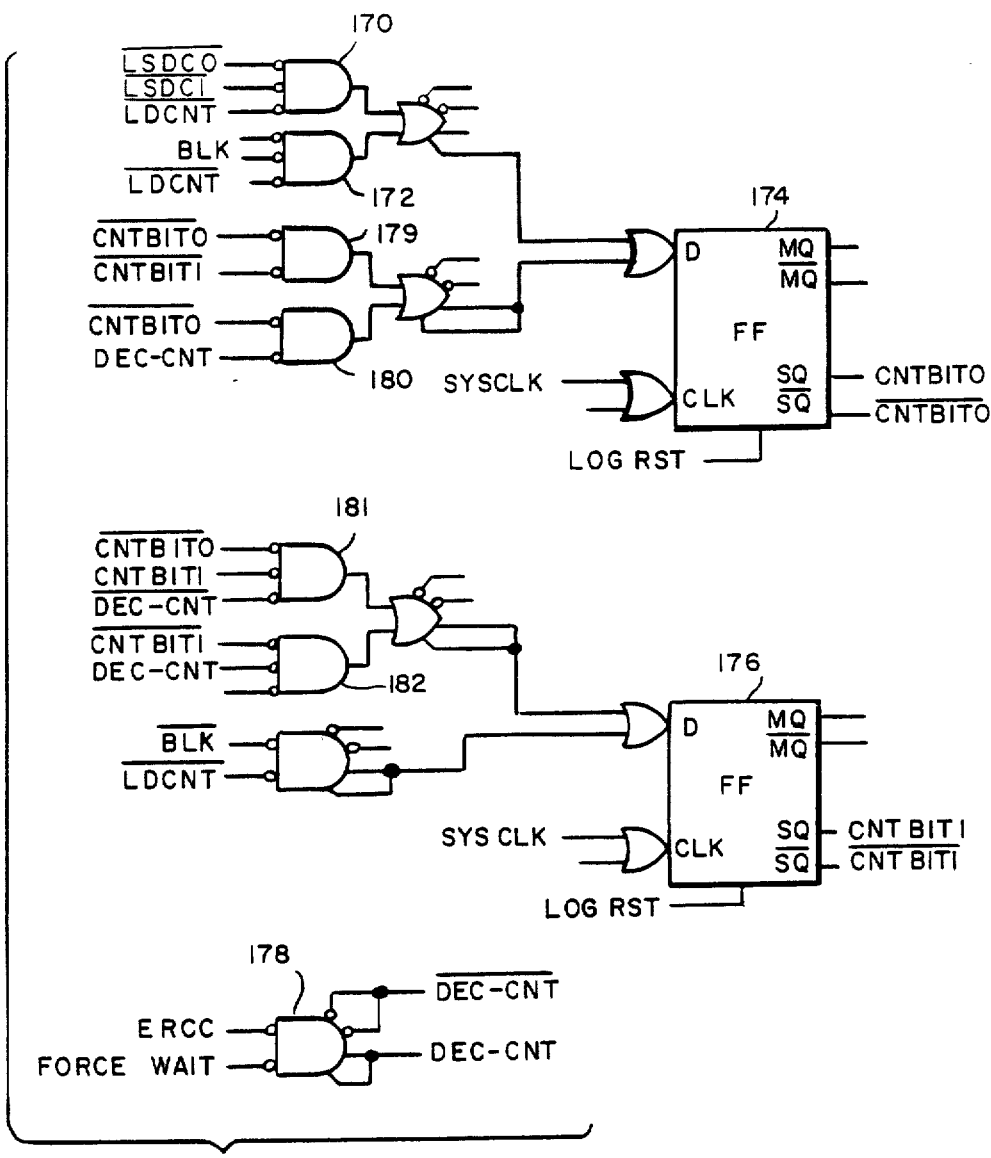

The command signals are used in conjunction with the load count signal to load the counter as shown in FIG. 9C. The counter in the preferred embodiment is two bits, the most significant bit CNTBIT0 and the least significant bit CNTBIT1. A system having block operations which involve the transfer of more than four words would require further bits in their counter. The logic gates 170 and 172 decode the instructions indicated by LSDC0, LSDC1 and BLK. BLK is generated from the command signals to indicate whether there is a block transfer. When the load count signal is asserted, each bit of the counter can be loaded with its correct value through flip flop 174 and flip flop 176. The counter will indicate the number of words in a transfer minus one.

The counter of the present invention is not a wrap around counter. In other words, if the counter is decremented to zero it will remain at zero if an attempt is made to decrement it further. At the completion of the data transfer of each word in a block or partial write instruction, the counter will be decremented. The decrement count signal DEC-CNT is generated in gate 178. The counter is decremented at the beginning of the transfer of a word of data during the data phase. A FORCE WAIT signal is generated at the beginning of the transfer of each word of data. FORCE WAIT is generated regardless of errors in the data. If the memory control unit detects an error in the data on the system bus, it will continue to assert WAIT and make a correction in the data so that corrected data can be provided for the system bus. The memory control unit will assert an error signal ERCC when it has detected an error and is in the process of correcting that error. Therefore, at the completion of FORCE WAIT if there is no error, the counter will be decremented in response to DEC-CNT. The counter is not decremented if there is an error signal ERCC asserted. Gates 179-182 indicate the use of the decrement count signal to decrement the counter.

Figure 9E:
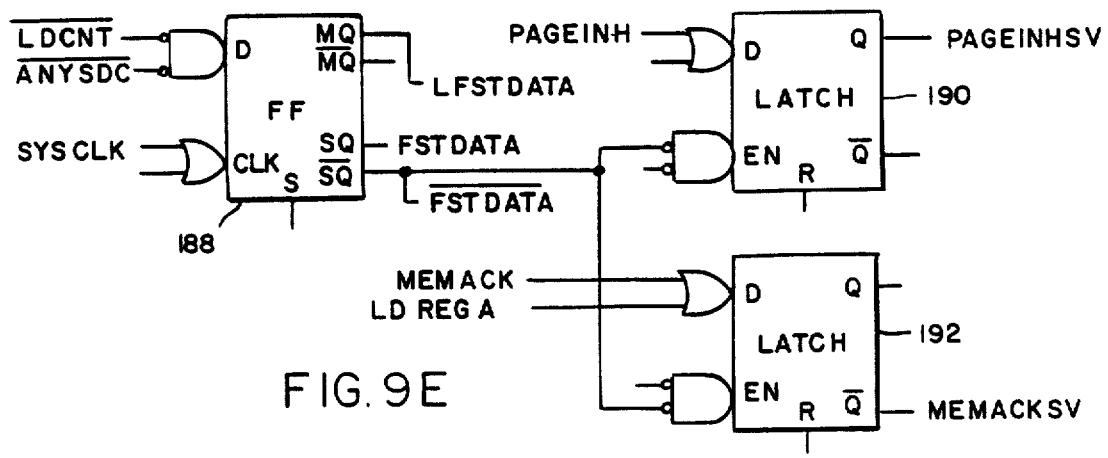
Figure 9I:
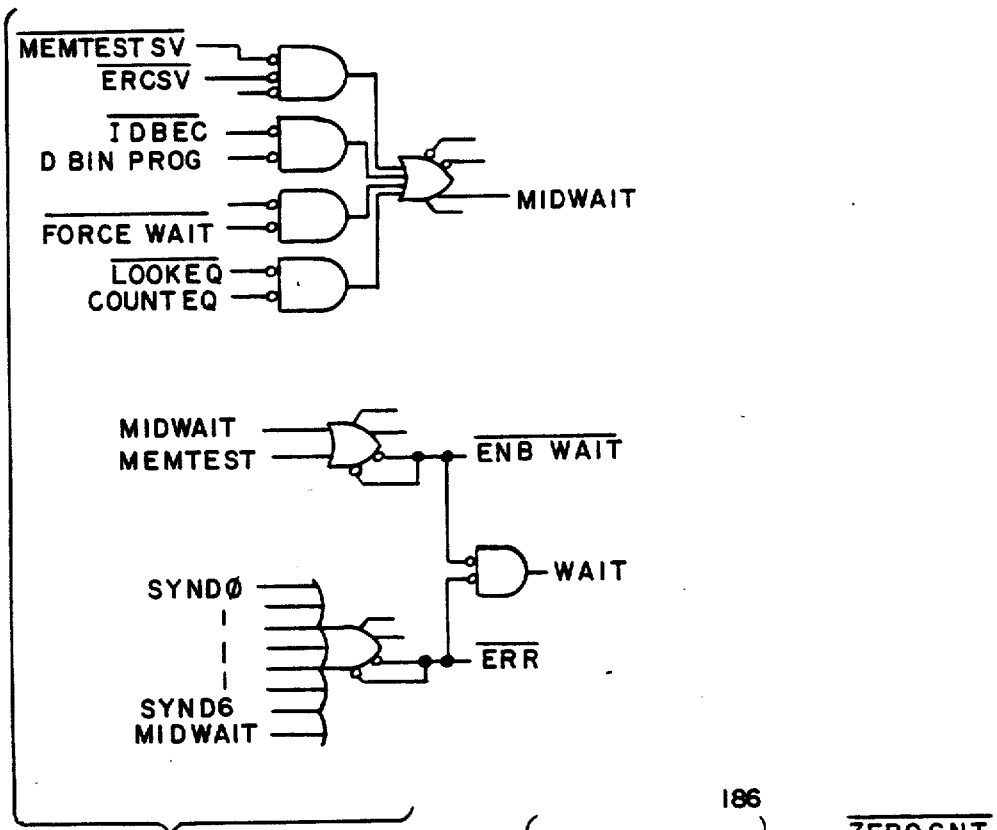
Figure 9D:
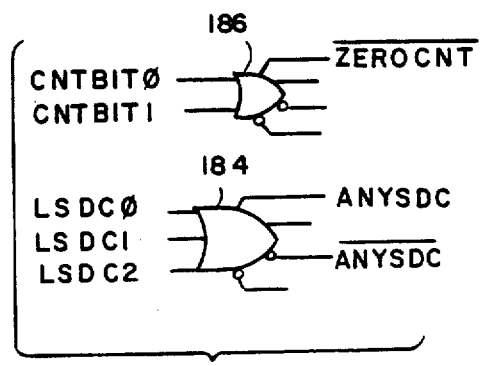

Gate 184 of FIG. 9D is used to generate ANYSDC which indicates that there is a valid command being issued over the command lines of the system bus. When all of the command bits are zero, a no-op is indicated. Gate 186 is used to generate a zero count signal ZEROCNT which indicates when the counter is at zero.

Referring now to FIG. 9E, flip-flop 188 is provided for generating the signals first data (FSTDATA) and latched first data (LFSTDATA). The first data signals are asserted when the load count signal is asserted and there is a valid command on the command lines. As indicated above, LDCNT indicates that it is either the beginning of a data phase or the bus is idle. The ANYSDC signal indicates that there is a valid command on the system bus. Therefore the combination of these signals indicates the commencement of the data phase.

Latch 190 provides a saved version of a page inhibit signal. The page inhibit signal (PAGEINH) is issued by a memory module when bad memory, memory that has failed, is being addressed. This is a feature of the presently preferred embodiment of the invention which is not necessary to the invention. However, it is a useful feature for avoiding unnecessary operations on memory which is no longer in use. For example, REFRESH and SNIFF operations which are normally carried out over an entire memory will be warned by the page inhibit signal that there is bad memory and that they can skip that page of memory. Latch 192 provides a saved version of MEMACK. MEMACK is also a signal provided by a memory module as discussed above. It is an acknowledgement signal from the memory module that a valid location in memory has been addressed.

Referring to FIG. 9F, an extend signal is included as an additional feature of the presently described system to handle situations in which there is no valid memory addressed in a read operation. Such a read from memory would cause an immediate provision of zeros over the data lines. The I/O channel controllers 17 would be unable to handle the rapid supply of these zeros over the data channel and they have no way of aborting the read before the zeros are sent. Since the address location in memory is not valid the memory module will not provide a data not ready signal (DNREADY). Therefore, the extend signal substitutes for the data not ready signal to prevent the memory module from proceeding faster than the I/O channel controller can handle. The signal EXT is asserted in gate 194 when there is a read from memory, and it is the first clock signal of a read data phase. EXT is combined with not MEMACK which indicates that no valid location in memory has been addressed. In such a case the memory module will be providing zeros over the data lines. Thus, when there is a read operation of an invalid memory location, the EXTEND signal will be asserted by flip flop 196.

Referring now to FIG. 9G, the generation of a FORCE WAIT signal is illustrated. A flip/flop 198 will cause FORCE WAIT to be asserted whenever the data phase starts as indicated by the signal LFSTDATA. FORCE WAIT is fed back into a multiplexor 200 in order to toggle between two criteria choices after the first clock cycle of the data phase. When FORCE WAIT has been asserted the multiplexor looks at whether the data is ready and whether there is an extend signal asserted. FORCE WAIT will remain asserted until the data is ready and the extend signal is deasserted. Once data is ready, WAIT will no longer be forced but will become conditional upon whether there is an error in the data. Thus, when DNREADY and EXTEND are not asserted, FORCE WAIT will become deasserted. While deasserted, the multiplexor will focus on the counter. If the counter is at zero, FORCE WAIT will remain unasserted. However, if there are more words to be transferred in this data phase, the FORCE WAIT signal shall be reasserted.

The initiation of test procedures in the memory control unit are provided for as shown in FIG. 9H. When FORCE WAIT is asserted and data is ready, flip/flop 202 will cause the assertion of TESTFF. The TESTFF signal indicates to the memory control unit the proper time to perform its error tests on the memory transferred over the system bus. The tests are performed as soon as the data becomes ready.

The signal MEMTEST is used only when data is being removed from memory. Thus, gates 203-205 which determine MEMTEST will decode the command signals to identify whether there is a read from memory instruction. In a complex operation such as a read modified write, a MEMTEST will only be performed on the second word of the data phase, that being the word which is taken from memory. A test of the memory will not be conducted if there is no valid memory location addressed by the pending instruction. Therefore, MEMACKSV is input into gate 205. Also, we do not use the MEMTEST when there is a page inhibit which indicates that dead memory has been addressed. Nor is there a MEMTEST in the midst of a double bit error correction cycle. The signal ERCSV indicates that corrected data is being driven on the system bus by the memory control unit. Thus, it is not desired to test this corrected data. LOOKEQ and COUNTEQ are signals used in conjunction with double bit error correction.

PARTEST indicates a parity test which is conducted at the appropriate time as determined by TESTFF when there is a write instruction or a transfer of data from one requester to another. In a partial write only the first data phase cycle is parity tested. The parity test is not conducted during refresh (REF-SV) or a double bit error correction (DBEC). The memory control unit also will not assert PARTEST if the memory control unit is the one driving the data bus (DRVSDFF).

Referring now to FIG. 9I the final determination of the WAIT signal can be described. The FORCE WAIT signal which has already been described above is asserted at the beginning of the data phase and it remains asserted while the data not ready signal is being asserted by a memory module. As shown in FIG. 9I, FORCE WAIT causes the assertion of MIDWAIT which asserts the WAIT signal. When FORCE WAIT is deasserted, WAIT may also be forced by a double bit error correction or an error signal and memory test on the previous clock cycle (MEMTESTSV and ERCSV).

When WAIT is not being forced it becomes conditional on whether there is an error in the data on the system bus 11 as determined by the memory control unit 19. In the embodiment shown, a number of syndrome bits (SYND 0-6) are provided which indicate whether an error is a single bit or multiple bit error and if it is a single bit error which bit has the error. If an error is detected by the memory control unit 19, at least one of the syndrome bits will be asserted. Error detection is well known in the art. The method of error detection does not form a part of this invention, except insofar as the occurrence of errors affect the timing of operations on the system bus. An error having occurred as a result of a memory test will cause the WAIT signal to remain asserted while the memory control unit corrects the data and then drives corrected data onto the system bus. The correction of the data by the memory control unit may be simple in the case of a single bit error correction or it may require a more complicated operation such as that resulting from a double bit error correction. The assertion of the WAIT signal by the memory control unit indicates to all of the requesters on the system bus that the data is not yet valid. Upon deassertion of the WAIT signal the data on the system bus will be valid and operation can proceed normally.

Preferably, the logic gates of the present invention, where possible, are constructed in gate arrays. Gate arrays have several advantages including their compactness, speed, low power requirements and reliability. However, other well known semiconductor technology, such as TTL logic, may be substituted for gate arrays and yet still fall within the scope of the invention.

Of course, it should be understood that various changes and modifications to the preferred embodiment described above will be apparent to those skilled in the art. For example, other equivalent logic may be substituted for that shown herein and still be used to implement the bus protocol of the present invention. Also, there may be occasions on which an input/output channel controller needs to generate a freeze signal. Although no specific logic was described herein, one of ordinary skill in the art can provide freeze generation logic for an I/O channel controller or any other module to be used in a system of the present invention. These and other changes can be made without departing from the spirit and the scope of the invention and without diminishing its attendant advantages. It is therefore intended that such changes and modifications be covered by the following claims.

We claim:

1. A bus interface for a requester on an open collector system bus of a computing system comprising:
   means for receiving a system clock signal from said system bus defining a succession of clock cycles;
   means for driving a system busy signal on said system bus;
   means for generating a first request signal during a clock cycle when said requester wants to drive an instruction having an address phase of at least two clock cycles followed by a data phase on said system bus and when said system busy signal is not being driven on said system bus, said first request signal causing said driving means to drive a system busy signal on said system bus; and
   means for prolonging the generation of the first request signal and driving of the system busy signal until the clock cycle in which said requester starts driving the instruction on said system bus, said prolonging means including:
   means for receiving other request signals from other requesters on said system bus;
   means, connected to receive said first request signal from said generating means, for generating a priority signal in a clock cycle as soon as said first request signal has been generated and no higher priority other request signals are being received;
   means for generating a drive freeze signal in response to said priority signal and signals from said system bus which indicate an address phase of an instruction from one of said other requesters has been completed; and
   means responsive to the first request signal and the absence of the drive freeze signal for prolonging the generation of the first request signal and the driving of the system busy signal until the drive freeze signal is generated.

2. A computing system comprising:
   a system bus;
   a plurality of requesters connected to said system bus, each requester having a different level of priority to access said bus;
   means connected to said system bus for providing a system clock defining a succession of clock cycles;
   means at each of said requesters for driving a system busy signal on said system bus;
   means in at least one of said requesters for generating a first request signal corresponding to the priority of the requester during a clock cycle when the at least one requester wants to drive an instruction having an address phase of at least two clock cycles followed by a data phase on said system bus and when said system busy signal is not being driven on said system bus, said first request signal causing said driving means of the at least one requester to drive a system busy signal on said system bus;
   means at each of said requesters responsive to said system busy signal for inhibiting the generation of its respective request signal when its respective request signal is not already being generated; and
   means at said at least one of said requesters for prolonging the generation of its first request signal and driving of the system busy signal until the clock cycle in which said at least one of said requesters starts driving the instruction on said system bus, said prolonging means including:
   means for receiving request signals from other of said requesters on said system bus;
   means, connected to receive its first request signal from its said generating means, for generating a priority signal in a clock cycle as soon as its first request signal has been generated and no higher priority request signals are being received from said other of said requesters;
   means for generating a drive freeze signal in response to said priority signal and other signals from said system bus which indicate an address phase of an instruction from another of said requesters has been completed; and
   means responsive to the first request signal and the absence of the drive freeze signal for prolonging the generation of the first request signal and the driving of the system busy signal until the drive freeze signal is generated.

3. The computing system of claim 2 further comprising:
   a memory module connected to said system bus and having an address latch and means for generating a freeze signal to prolong the address phase of the instruction from said at least one requester on said system bus when the instruction is directed to said memory module and said address latch is full.

4. The computing system of claim 2 further comprising:
   means on said system bus for generating a freeze signal to prolong the address phase of the instruction from said at least one requester when said instruction includes a multiple data transfer.

5. The computing system of claim 4 wherein said freeze signal generating means includes a counter for counting down each data transfer in a multiple data transfer, said freeze signal generating means generating a freeze signal while said counter is non-zero.

6. The computing system of claim 2 further comprising:
   a memory module connected to said system bus and having means for asserting a data not ready signal in response to the address phase of the instruction from said at least one requester when said memory module is not ready to place requested data on said system bus; and
   means connected to said system bus for generating a freeze signal to prolong the address phase of the instruction from said at least one requester when the data not ready signal is asserted and the address phase contains a valid command.

7. The computing system of claim 2 further comprising means connected to said system bus for driving a wait signal at the beginning of the data phase of said instruction which is indicated when there is no freeze signal, no wait signal and a valid command on said system bus.

8. The computing system of claim 7 further comprising means connected to said system bus for prolonging the drive of a wait signal if an error is detected in data being transferred on said system bus.

9. The computing system of claim 8 wherein said means for generating a drive freeze signal determines the completion of the address phase when said system bus is carrying no freeze signal and no wait signal or said system bus has not had a freeze signal for two consecutive clock cycles.

10. In a computing system having a plurality of requesters connected to a system bus, a method for controlling access to said bus, comprising the steps of:
    driving a system clock defining a succession of clock cycles;
    generating one or more request signals and a system busy signal in said system bus during one of the clock cycles;
    inhibiting the generation of any further request signals while the system busy signal is generated;
    providing access to said system bus to each requester that generated a request signal in order of priority;
    driving a freeze signal when one of said requesters obtains access to said system bus, said freeze signal being driven by said requester at the start of an address phase on said system bus, wherein said freeze signal is used to prolong said address phase;
    driving an address on said system bus upon obtaining access to said system bus, wherein driving an address comprises an address phase lasting at least two clock cycles;
    said system busy signal being completely released when each requester that generated a request signal has been provided access to said system bus such that one clock cycle after the address phase begins for the last of the requesters to obtain access to said system bus the generation of further request signals is no longer inhibited;
    driving a wait signal from a memory control unit connected to said system bus at the beginning of a data phase, the beginning of said data phase being indicated when there is no freeze signal, no wait signal and a valid command on said system bus; and
    prolonging the driving of said wait signal if an error is detected in data being transferred on said system bus.

11. The bus access control method of claim 10 further comprising the step of driving the freeze signal from said memory control unit when the address phase is prolonged responsive to a multiple data transfer.

12. The bus access control method of claim 10 further comprising the step of driving the freeze signal from a memory module on said system bus when data is not ready to be read out of said memory module.

13. The bus access control method of claim 10 further comprising the step of driving the freeze signal when an address latch is full.

14. A computer system comprising: s system bus, on which information of operations are transferred in an address phase followed by a data phase, for transferring address and data of operations, respectively;
    a plurality of requesters connected to said system bus, each of said requesters having an address latch, means for determining whether a write operation is pending in the data phase on said system bus, and means for generating a freeze signal to prolong the address phase of a pending operation on said system bus in response to a pending write operation in the data phase and said address latch being full with a previously received address;
    a memory module connected to said system bus and having an address latch and means for generating the freeze signal to prolong the address phase of a pending operation on said system bus when the pending operation is directed to said memory module and said address latch is full;
    control unit means on said system bus for generating the freeze signal to prolong the address phase of an operation when said operation includes a multiple data transfer;
    means connected to said system bus for driving a wait signal at the beginning of a data phase of said operation, the beginning of said data phase being indicated when there is no freeze signal, no wait signal and a valid command on said system bus; and
    means connected to said system bus for prolonging the driving of a wait signal if an error is detected in data being transferred on said system bus.

15. The computing system of claim 14 wherein said control unit means includes a counter for counting down each data transfer in a multiple data transfer, said control unit means generating the freeze signal while said counter is non-zero.

16. The computing system of claim 14 further comprising:
    means, within said memory module, for asserting a data not ready signal in response to the address phase of the operation requesting a read from said memory module when said memory module is not ready to place the requested data on said system bus; and
    wherein said control unit means further includes means for generating the freeze signal to prolong the address phase of the operation when the data not ready signal is asserted and the address phase contains a valid command.

* * * * *